(No Model.)
F. DANIELSON.
BALL BEARING.
No. 596,984. Patented Jan. 11, 1898.
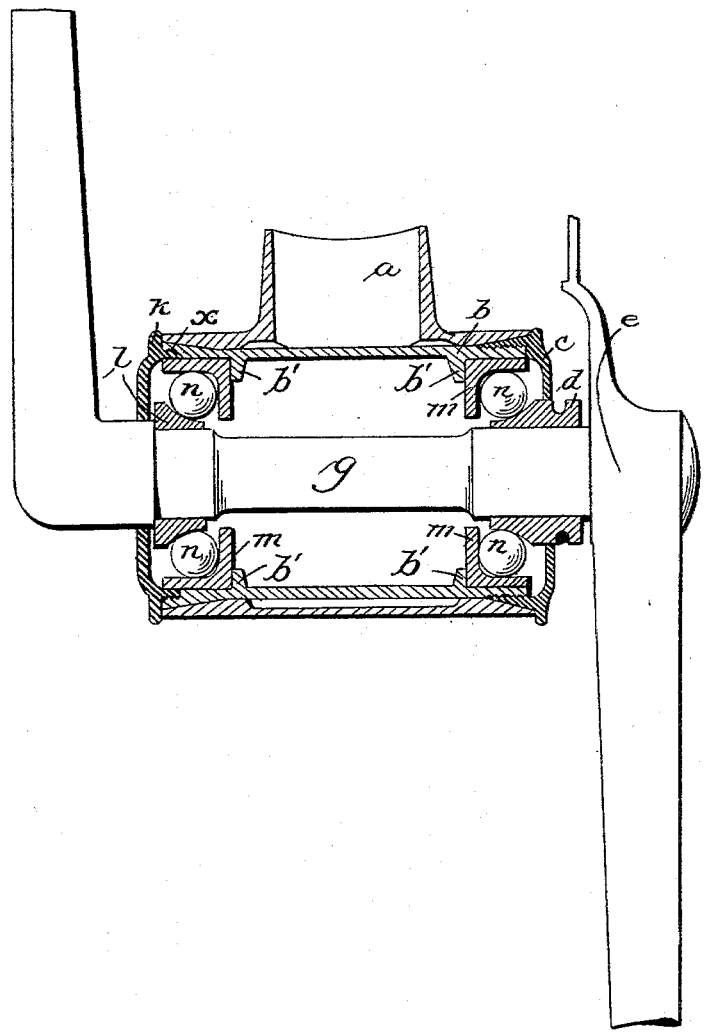
Attest
F. L. Middleton
W. E. Ourand
Inventor
Frank Danielson
By Richards & Co.
Attys.

UNITED STATES PATENT OFFICE.

FRANK DANIELSON, OF CHICAGO, ILLINOIS.

BALL-BEARING.

SPECIFICATION forming part of Letters Patent No. 596,984, dated January 11, 1898.

Application filed February 9, 1897. Serial No. 622,723. (No model.)

*To all whom it may concern:*

Be it known that I, FRANK DANIELSON, a citizen of the United States, residing at Chicago, Illinois, have invented certain new and useful Improvements in Ball-Bearings, of which the following is a specification.

My invention relates to bearings for cycles and the like; and my object is to provide a simple economical form of ball-bearing which may be readily taken apart and which when in use is tightly held and is not liable to lateral play.

The drawing shows the invention in section. It will be understood that while I show the invention as applied to a crank-hanger it may be used for hubs of the wheels alone. The crank-hanger is shown at $a$ and it has its ends internally flared. Within this hanger a sleeve $b$ fits, having at one end a flared portion adapted to fit the flared interior of the hanger, while the other end is cylindrical, so that the sleeve may be inserted from one side and drawn through to seat the flared portions together. The cylindrical portion or end of the sleeve leaves a flaring space between it and the remaining flared end of the hanger, and a collar $c$, having a beveled or tapered rim, fits in this recess and is preferably secured by screw-threads on the rim engaging the screw-threads on the end of the sleeve. The collar has also a small flange fitting against the end of the hanger, and by turning this collar the sleeve will be drawn firmly against the flared portion at the opposite end of the hanger, while the tapered rim of the collar will seat itself against the hanger, thus locking the sleeve securely in place and securing such a wedging action as to make a tight fit and prevent all play of the sleeve within the hanger. At the opposite end of the sleeve a second collar $k$ is arranged, being secured thereto by a screw-thread at $x$. The sleeve $b$ has ribs $b'$ within it, and the cups $m$ are driven in against these ribs and are held accurately to receive the balls. The crank-shaft $g$ carries the cones $l$ and $d$, as usual, and the crank $e$ is secured to the end of the shaft in any suitable manner.

The cups are marked $m$ and the balls are marked $n$.

The sleeve is preferably cylindrical, but may be of any other shape.

I claim as my invention—

1. In combination with a hub or crank-hanger having the internally-flared end, a sleeve having one end flared, means for drawing the sleeve into place and the balls and cups, said sleeve carrying the ball-cups, substantially as described.

2. In combination with the hub or crank-hanger having the flared ends, the sleeve having one end flared externally and the collar having the tapered rim to fit between the cylindrical end of the sleeve and the flared portion of the hanger, substantially as described.

3. In combination a hanger or hub having its ends flared, the sleeve having one end externally flared and the other end cylindrical and screw-threaded, the collar having the tapered screw-rim to engage the threaded end of the sleeve, and a collar screw-threaded into the other end of the sleeve for securing the same, substantially as described.

4. In combination, the sleeve, having the inwardly-projecting ribs $b'$, the axle, the ball-cones and the ball-cups inserted in the sleeve, the bottoms or inner walls of the cups being toward the interior of the sleeve, said bottoms resting upon the ribs $b'$, substantially as described.

5. In combination, in a bicycle-bearing, the sleeve or hanger, and the ball-bearings having the ball-cups and the ball-cones, the said cups being arranged with their bottoms toward the interior of the sleeve or hanger, substantially as described.

In witness whereof I have hereunto set my hand in presence of two witnesses.

FRANK DANIELSON.

Witnesses:
HENRY S. JUDD,
EDWIN S. OSBORN.